(12) United States Patent
Raul et al.

(10) Patent No.: US 12,503,176 B2
(45) Date of Patent: Dec. 23, 2025

(54) PASSIVE JET SYSTEM ARRANGED AT FRONT WHEELS OF A VEHICLE

(71) Applicant: GM Global Technology Operations LLC, Detroit, MI (US)

(72) Inventors: Vishal Raul, Northville, MI (US); Taeyoung Han, Troy, MI (US); Shailendra Kaushik, Novi, MI (US); Bahram Khalighi, Holladay, UT (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 408 days.

(21) Appl. No.: 18/301,646

(22) Filed: Apr. 17, 2023

(65) Prior Publication Data

US 2024/0343317 A1    Oct. 17, 2024

(51) Int. Cl.
*B62D 35/00* (2006.01)
*B62D 37/02* (2006.01)

(52) U.S. Cl.
CPC ........... *B62D 35/005* (2013.01); *B62D 37/02* (2013.01)

(58) Field of Classification Search
CPC ...... B62D 35/005; B62D 37/02; B62D 35/02; B62D 35/00; Y02T 10/82
USPC ....................................................... 296/180.1
See application file for complete search history.

(56) References Cited

U.S. PATENT DOCUMENTS

| | | | |
|---|---|---|---|
| 5,074,592 A * | 12/1991 | White ................... | B62D 25/168 239/290 |
| 8,210,600 B1 * | 7/2012 | Verhee ................. | B62D 35/005 296/180.1 |
| 9,073,583 B2 * | 7/2015 | Hasegawa ............... | B62D 25/16 |
| 10,668,958 B2 * | 6/2020 | Seitz .................... | B62D 35/005 |

* cited by examiner

*Primary Examiner* — Roger L Pang
(74) *Attorney, Agent, or Firm* — CANTOR COLBURN LLP

(57) ABSTRACT

A passive jet system for disrupting an airflow at a surface of a front wheel for a vehicle includes a duct including an inlet exposed to an airflow, an outlet fluidically directed toward a forward surface of the front wheel, and a passage having a flow-accelerating profile operable to increase a velocity of the airflow passing from the inlet toward the outlet.

20 Claims, 4 Drawing Sheets

PASSIVE JET SYSTEM ARRANGED AT FRONT WHEELS OF A VEHICLE

The subject disclosure relates to the art of vehicles and, more particularly, to a passive jet system configured to disrupt air currents at front wheels of the vehicle.

As vehicles move through an airstream, drag is produced. That is, air currents impact exposed surfaces of the vehicle and create drag. Drag imparts a retarding force on the vehicle. This retarding force has an impact on fuel consumption and, by extension, fuel efficiency of the vehicle. The effects of drag are particularly felt by electric vehicles where range and available charging stations are a concern. Various stationary surfaces contribute to drag. Flat forward facing surfaces such as grills, lights, body components, and the like all contribute to reducing an overall operational range of a vehicle.

In addition to stationary surfaces, dynamic surfaces such as wheels, also contribute to drag effects. In order to reduce drag at the wheels, vehicle manufacturers have incorporated strakes into internal wheel well surfaces and/or positioned deflectors in front of the wheels. While the deflectors do have a positive effect on drag, the deflectors also themselves contribute to drag effects. Accordingly, it is desirable to provide a system for interrupting airflow at forward surfaces of a vehicle wheel without adding additional drag inducing surfaces.

SUMMARY

A passive jet system for disrupting an airflow at a surface of a front wheel for a vehicle includes a duct including an inlet exposed to an airflow, an outlet fluidically directed toward a forward surface of the front wheel, and a passage having a flow-accelerating profile operable to increase a velocity of the airflow passing from the inlet toward the outlet.

In addition to one or more of the features described herein the duct includes a first member having a first end, a second end, and an intermediate portion having a first inner surface and a second member having a first end portion, a second end portion and an intermediate section having a second inner surface that is spaced from the first inner surface, at least one of the first inner surface and the second inner surface defining the flow-accelerating profile.

In addition to one or more of the features described herein the first end of the first member is arranged directly adjacent to the first end portion of the second member.

In addition to one or more of the features described herein the second member includes an airfoil shaped cross-section.

In addition to one or more of the features described herein the first member includes a first lateral side and a second lateral side, and the second member includes a first lateral side portion and a second lateral side portion that are substantially parallel, the first lateral side being joined to the first lateral side portion by a first end plate and the second lateral side being joined to the second lateral side portion by a second end plate.

In addition to one or more of the features described herein the inlet tapers from the first end toward the intermediate portion.

In addition to one or more of the features described herein the inlet diverges from the first end toward the intermediate portion.

In addition to one or more of the features described herein the inlet of the duct includes a first area and the outlet of the duct includes a second area, the second area being smaller than the first area.

In addition to one or more of the features described herein the intermediate portion includes a first curvature and the intermediate section includes a second curvature that is distinct from the first curvature.

In addition to one or more of the features described herein the inlet is axially off-set relative to the outlet.

A vehicle, according to a non-limiting example, includes a body including a forwardly facing portion having a lower edge, a rearwardly facing portion and a passenger compartment positioned between the forwardly facing portion and the rearwardly facing portion. A wheel well is defined aft of the lower edge of the forwardly facing portion. A wheel including a driving surface is rotatably supported in the wheel well. A passive jet system is mounted to the lower edge of the forwardly facing portion. The passive jet system includes a duct having an inlet exposed to an airflow, an outlet fluidically directed toward the driving surface of the wheel, and a passage having a flow-accelerating profile operable to increase a velocity of the airflow passing from the inlet toward the outlet.

In addition to one or more of the features described herein the duct includes a first member having a first end, a second end, and an intermediate portion having a first inner surface and a second member having a first end portion, a second end portion and an intermediate section having a second inner surface that is spaced from the first inner surface, at least one of the first inner surface and the second inner surface defining the flow-accelerating profile.

In addition to one or more of the features described herein the first end of the first member is arranged directly adjacent to the first end portion of the second member.

In addition to one or more of the features described herein the second member includes an airfoil shaped cross-section.

In addition to one or more of the features described herein the first member includes a first lateral side and a second lateral side, and the second member includes a first lateral side portion and a second lateral side portion that are substantially parallel, the first lateral side being joined to the first lateral side portion by a first end plate and the second lateral side being joined to the second lateral side portion by a second end plate.

In addition to one or more of the features described herein the inlet tapers from the first end toward the intermediate portion.

In addition to one or more of the features described herein the inlet diverges from the first end toward the intermediate portion.

In addition to one or more of the features described herein the inlet of the duct includes a first area and the outlet of the duct includes a second area, the second area being smaller than the first area.

In addition to one or more of the features described herein the intermediate portion includes a first curvature and the intermediate section includes a second curvature that is distinct from the first curvature.

In addition to one or more of the features described herein the inlet is axially off-set relative to the outlet.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
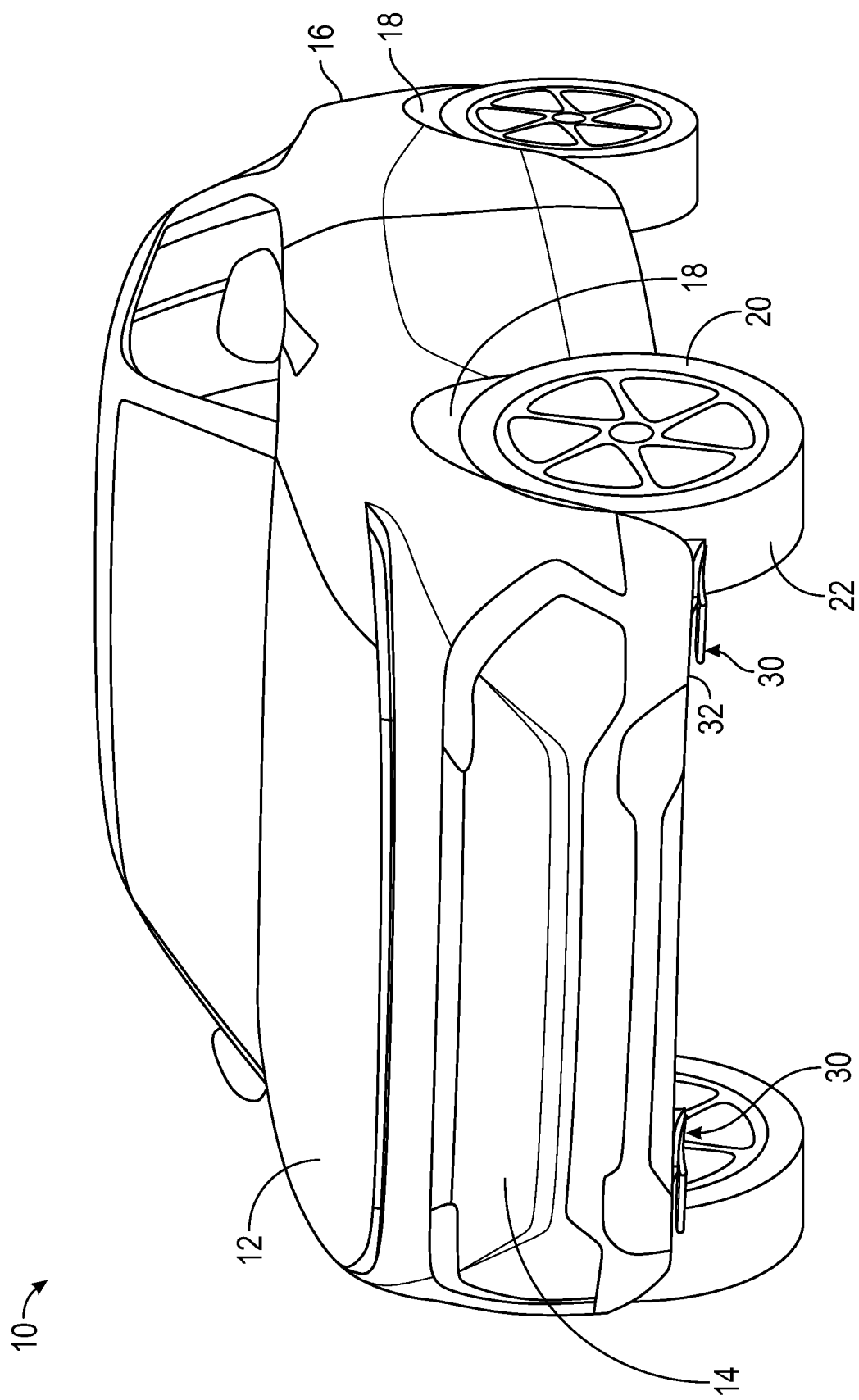
FIG. 1 is a front left perspective view of a vehicle including a passive jet system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 having a forwardly facing portion 14 and a rearwardly facing portion 16. A wheel well 18 is arranged aft of forwardly facing portion 14 on a left side (not separately labeled) of vehicle 10. A front wheel 20 is rotatably supported in wheel well 18. Front wheel 20 includes a driving surface 22. Driving surface 22 is a surface of front wheel 20 that contacts, for example, a road. In the non-limiting example shown, vehicle 10 includes four wheel wells 18 each having a corresponding wheel (e.g., front wheels and rear wheels).

In a non-limiting example, vehicle 10 includes a passive jet system 30 mounted to a lower surface 32 of forwardly facing portion 14. Lower surface 32 may form part of an underbody (not separately labeled) of vehicle 10. As will be detailed herein, passive jet system 30 delivers a flow of air towards driving surface 22 of wheel 20 in order to disrupt air currents and reduce drag. At this point, it should be understood that the term "passive" describes a system that relies on flow shaping to create a jet of air directed at driving surface 22. Passive jet system 30 does not rely on any active flow generation systems such as fans, motors, and the like to create and/or modify the air flow directed toward driving surface 22.

Figure 2:
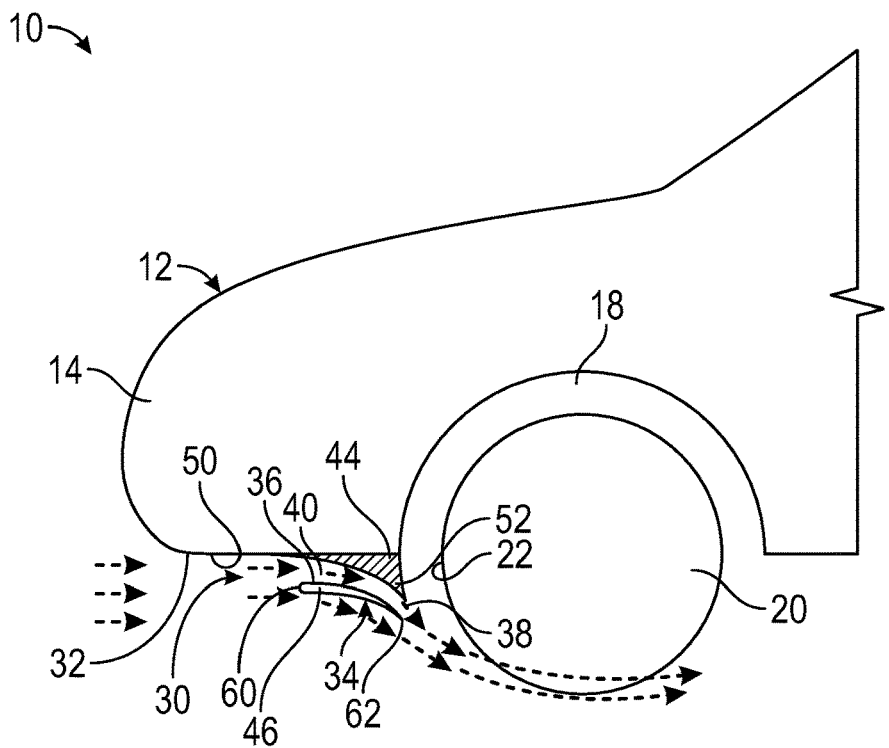
FIG. 2 is a left side view of a front wheel portion of the vehicle of FIG. 1 depicting a cross-section of the passive jet system, in accordance with a non-limiting example.
Figure 3:
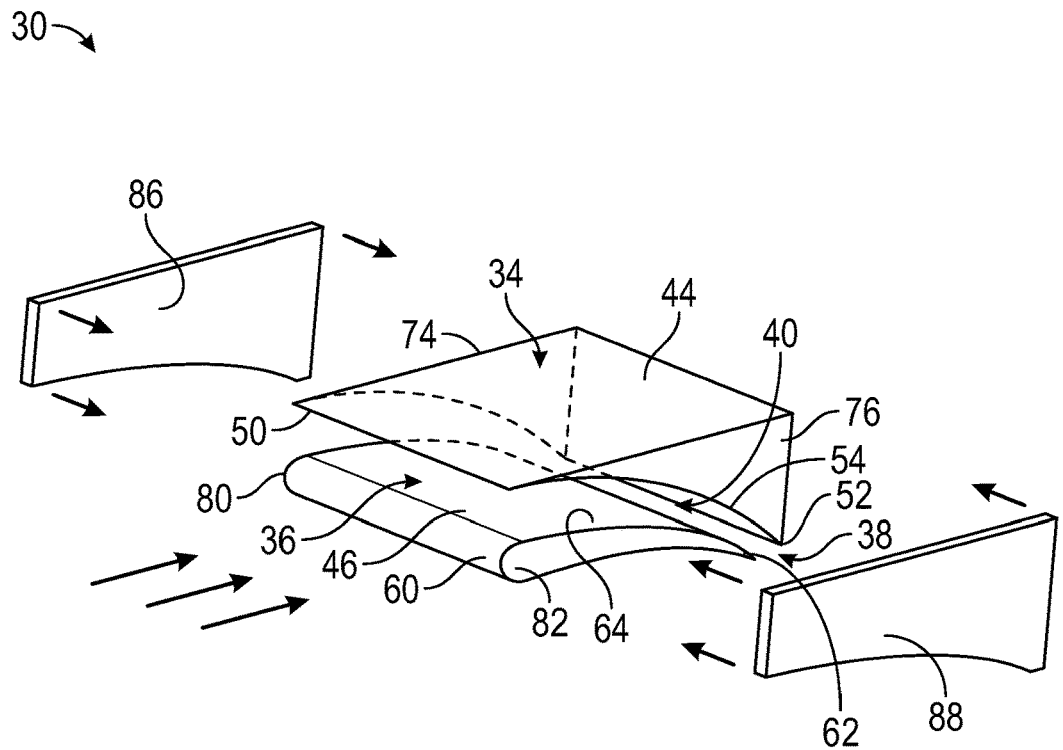
FIG. 3 is a disassembled view of the passive jet system of FIG. 2, in accordance with a non-limiting example.

Referring to FIGS. 2 and 3, passive jet system 30 includes a duct 34 having an inlet 36, an outlet 38, and a passage 40 extending between inlet 36 and outlet 38. In a non-limiting example, outlet 38 extends across between 50%-80% of driving surface 22. Outlet 38 may be directed directly toward a center of driving surface 22 or, depending on vehicle performance characteristics, i.e., body styling, motor type, and the like, be directed toward either side of the center of driving surface 22. In a non-limiting example, passage 40 includes a flow-accelerating profile which operates to increase a velocity of the airflow passing from inlet 36 toward outlet 38. Inlet 36 receives a flow of air as vehicle 10 moves forward through an airstream. That flow of air is accelerated through passage 40 by the flow-accelerating profile and is discharged through outlet 38 toward driving surface 22.

In a non-limiting example, duct 34 includes a first member 44 spaced from second member 46 by passage 40. First member 44 includes a first end 50, a second end 52, and an intermediate portion 54 that extends between first end 50 and second end 52. Intermediate portion 54 includes a first curvature defined by a radius. The radius of the curvature of intermediate portion 54 may depend on a number of characteristics including body front end geometry. Second member 46 includes an airfoil-shaped cross-section having a first end portion 60, a second end section 62, and an intermediate section 64 that extends between the first end portion 60 and second end portion 62. First end portion 60 is rounded, in accordance with a non-limiting example. Intermediate section 64 includes a second curvature. In a non-limiting example, the first and second curvatures are different. However, the first curvature could match the second curvature under certain select design considerations. The first and second curvatures establish the flow-accelerating profile.

In a non-limiting example, first member 44 includes a first lateral side 74 and a second lateral side 76. Second member 46 includes a first lateral side portion 80 and a second lateral side portion 82. First lateral side 74 and second lateral side 76 are substantially parallel. Likewise, first lateral side portion 80 and second lateral side portion 82 are parallel. A first end plate 86 connects first lateral side 74 and first lateral side portion 80. A second end plate 88 connects second lateral side 76 and second lateral side portion 82. First end plate 86 and second end plate 88 are substantially parallel.

In a non-limiting example, as vehicle 10 moves forward at typical road speeds, air enters inlet 36, flows through passage 40 and is accelerated by the flow-acceleration profile created by the first curvature and the second curvature. The air passes from outlet 38 as a jet or accelerated flow and is directed outwardly and downwardly toward driving surface 22 of wheel 20. The accelerated flow directed at driving surface 22 disrupts drag inducing air currents resulting from forward travel of vehicle 10. Disrupting the drag inducing air currents reduces drag at the driving surface 22 of each front wheel 20. Reducing drag on components of vehicle 10 will create aerodynamic efficiencies that lead to improved range.

Figure 4:
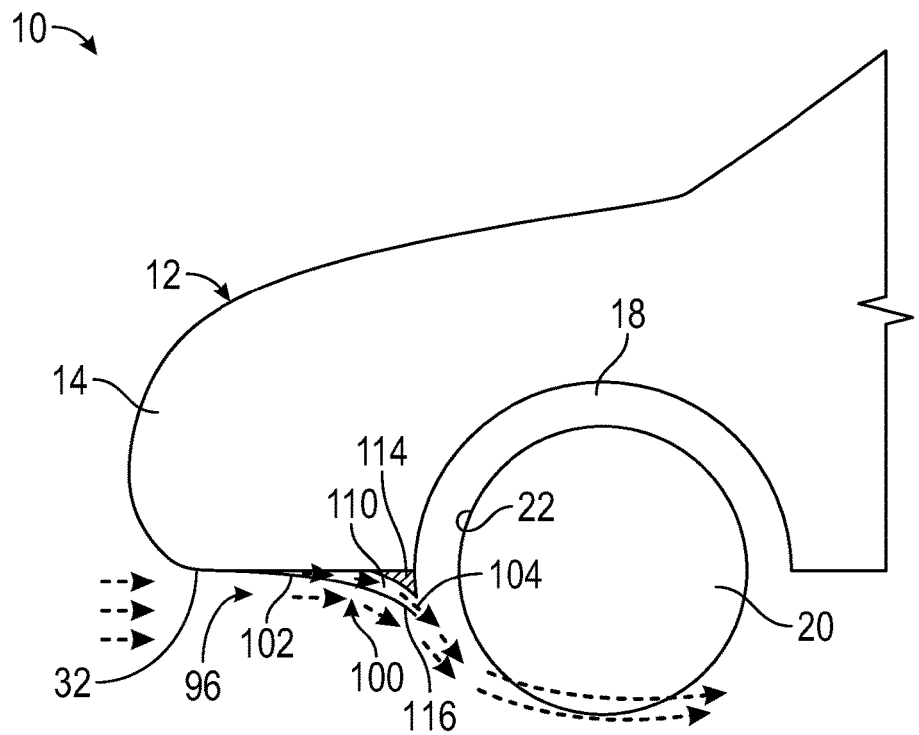
FIG. 4 is a left side view of a front wheel portion of the vehicle of FIG. 1 depicting a cross-section of the passive jet system, in accordance with another non-limiting example.
Figure 5:
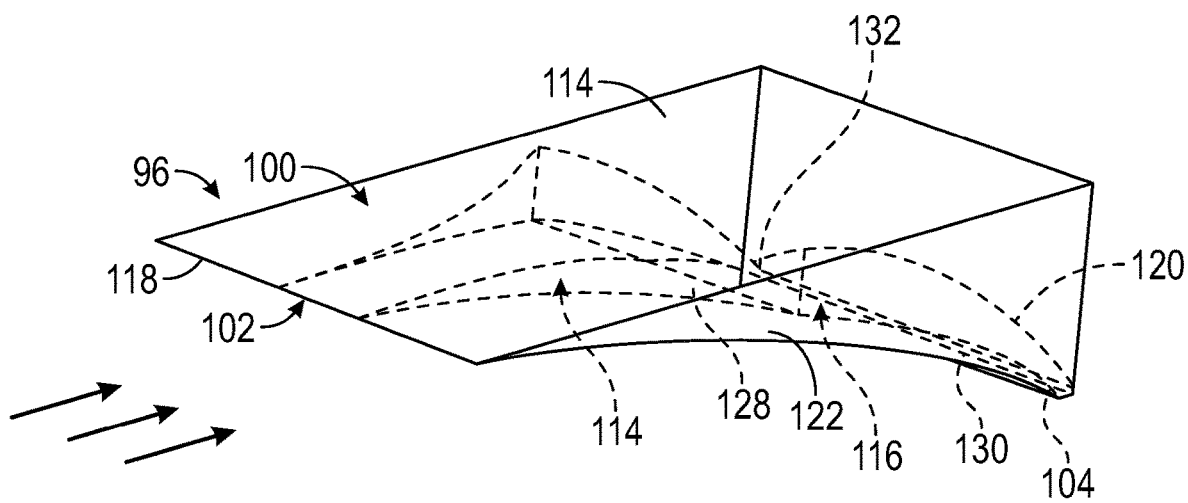
FIG. 5 is an upper left perspective view of the passive jet system of FIG. 4, in accordance with a non-limiting example.
Figure 6:
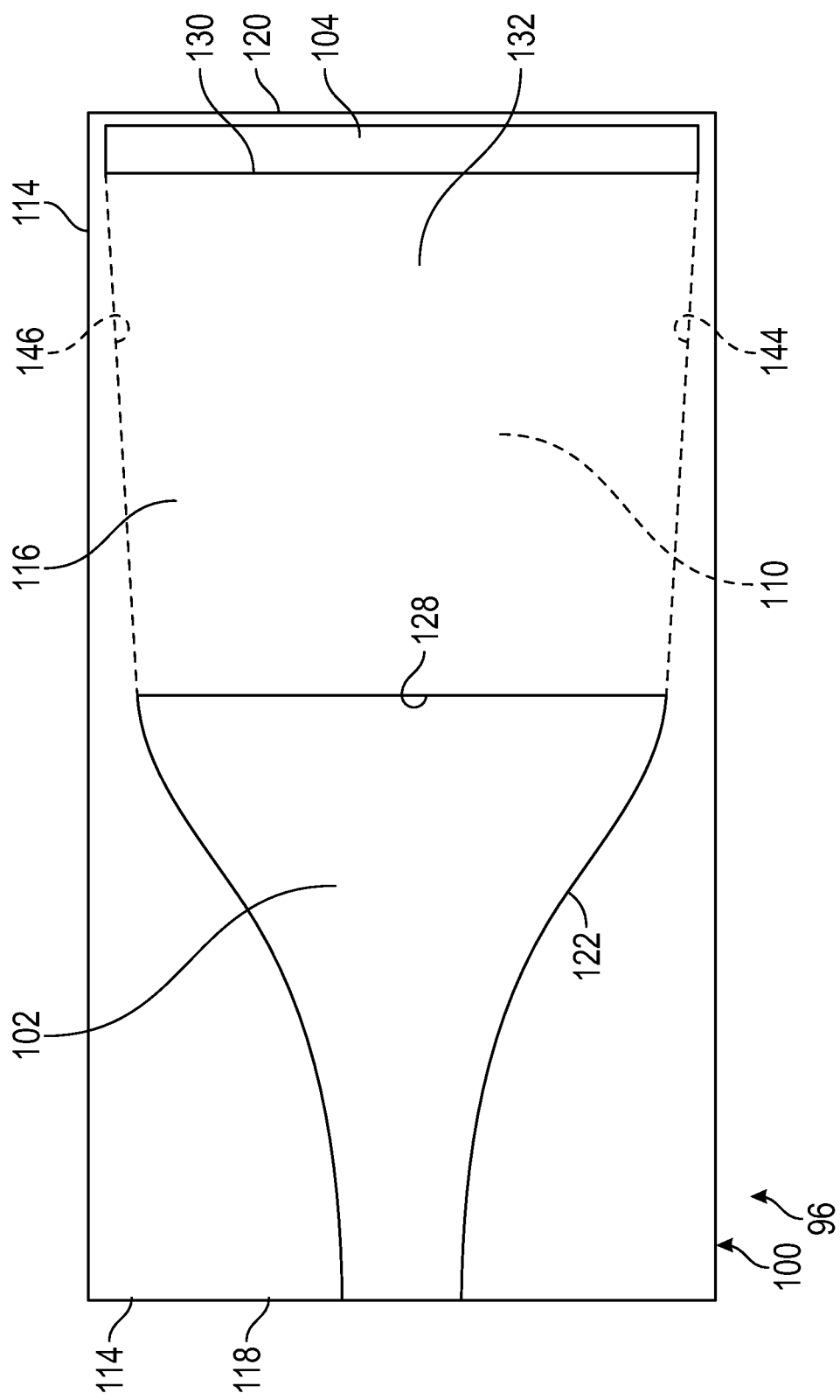
FIG. 6 is a bottom view of the passive jet system of FIG. 5, in accordance with a non-limiting example.

Reference will now follow to FIGS. 4, 5, and 6 in describing a passive jet system 96 in accordance with another non-limiting example. Passive jet system 96 includes a duct 100 that is mounted to, or integrated into (i.e., formed integrally with) lower surface 32 of vehicle 10. Duct 100 includes an inlet 102, an outlet 104, and a passage 110 extending between inlet 102 and outlet 104. In a non-limiting example, outlet 104 extends across between 50%-80% of driving surface 22. Outlet 104 may be directed directly toward a center of driving surface 22 or, depending on vehicle performance characteristics, i.e., body styling, motor type, and the like, be directed toward either side of the center of driving surface 22. Passage 110 includes a flow-accelerating profile which operates to increase a velocity of the airflow passing from inlet 102 toward outlet 104. Inlet 102 includes a first area and outlet 104 includes a second area. In a non-limiting example, the first area is larger than the second area. That is, the first area may be three times or greater larger than the second area.

In a non-limiting example, duct 100 includes a first member 114 and a second member 116. Second member 116 is spaced from first member 114 forming passage 110. First member 114 includes a first end 118, a second end 120, and an intermediate portion 122. Intermediate portion 122 includes a first curvature. Second member 116 includes a first end portion 128, a second end portion 130, and an intermediate section 132. Intermediate section 132 includes a second curvature. In a non-limiting example, the first and second curvatures are different. However, the first curvature could match the second curvature under certain select design considerations. The first and second curvatures establish, at least in part, the flow-accelerating profile.

In a non-limiting example, first end portion 128 of second member 116 is a terminal end portion that extends across intermediate portion 122 of first member 114. Thus, in a non-limiting example, a portion of passage 110 is exposed. That is, a section of passage 110 is not covered by second member 116. In a non-limiting example, first member 114 may include a recess 140 that extends from first end 118 through a portion of intermediate portion 122. Recess 140 tapers from first end 118 to first end portion 128 of second member 116. In a non-limiting example, recess 140 diverges from first end 118 to first end portion 128.

In a non-limiting example, passage 110 includes a first lateral side 144 and a second lateral side 146. First and second lateral sides 144 and 146 are non-parallel. That is, first and second lateral sides 144 and 146 continue the divergence of recess 140. The particular geometry of passage 110 contributes to forming the flow-accelerating profile. In a manner similar to that described herein air passing passage 110 and is accelerated by the flow-acceleration profile. The air passes from outlet 104 as a jet or accelerated flow and is directed outwardly and downwardly toward driving surface 22 of wheel 20. The accelerated flow directed at driving surface 22 disrupts drag inducing air currents resulting from forward travel of vehicle 10. Disrupting the drag inducing air currents reduces drag at the driving surface 22 of each front wheel 20. Reducing drag on components of vehicle 10 will create aerodynamic efficiencies that lead to improved range.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A passive jet system for disrupting an airflow at a surface of a front wheel for a vehicle, the passive jet system comprising
    a duct including an inlet exposed to an airflow, an outlet fluidically directed directly onto a forward surface of the front wheel, and a passage having a flow-accelerating profile operable to increase a velocity of the airflow passing from the inlet toward the outlet,
    wherein the duct includes a first member having a first end, a second end, and an intermediate portion having a first inner surface and a second member having a first end portion, a second end portion and an intermediate section having a second inner surface that is spaced from the first inner surface, at least one of the first inner surface and the second inner surface defining the flow-accelerating profile, and
    wherein the second member includes an airfoil shaped cross-section.

2. The passive jet system according to claim 1, wherein the first end of the first member is arranged directly adjacent to the first end portion of the second member.

3. The passive jet system according to claim 1, wherein the first member includes a first lateral side and a second lateral side, and the second member includes a first lateral side portion and a second lateral side portion that are substantially parallel, the first lateral side being joined to the first lateral side portion by a first end plate and the second lateral side being joined to the second lateral side portion by a second end plate.

4. The passive jet system according to claim 1, wherein the inlet tapers from the first end toward the intermediate portion.

5. The passive jet system according to claim 4, wherein the inlet diverges from the first end toward the intermediate portion.

6. The passive jet system according to claim 4, wherein the inlet of the duct includes a first area and the outlet of the duct includes a second area, the second area being smaller than the first area.

7. The passive jet system according to claim 1, wherein the intermediate portion includes a first curvature and the intermediate section includes a second curvature that is distinct from the first curvature.

8. The passive jet system according to claim 1, wherein the inlet is axially off-set relative to the outlet.

9. The passive jet system according to claim 1, wherein the passage continuously increases in width from the inlet to the outlet.

10. The passive jet system according to claim 1, wherein the duct is configured to be mounted on an underbody of the vehicle.

11. A vehicle comprising:
    a body including a forwardly facing portion having a lower edge, a rearwardly facing portion and a passenger compartment positioned between the forwardly facing portion and the rearwardly facing portion;
    a wheel well defined aft of the lower edge of the forwardly facing portion;

a wheel including a driving surface rotatably supported in the wheel well; and a passive jet system mounted to the lower edge of the forwardly facing portion, the passive jet system including a duct having an inlet exposed to an airflow, an outlet fluidically directed directly onto the driving surface of the wheel, and a passage having a flow-accelerating profile operable to increase a velocity of the airflow passing from the inlet toward the outlet, wherein the duct includes a first member having a first end, a second end, and an intermediate portion having a first inner surface and a second member having a first end portion, a second end portion and an intermediate section having a second inner surface that is spaced from the first inner surface, at least one of the first inner surface and the second inner surface defining the flow-accelerating profile, and wherein the second member includes an airfoil shaped cross-section.

12. The vehicle according to claim 11, wherein the first end of the first member is arranged directly adjacent to the first end portion of the second member.

13. The vehicle according to claim 11, wherein the first member includes a first lateral side and a second lateral side, and the second member includes a first lateral side portion and a second lateral side portion that are substantially parallel, the first lateral side being joined to the first lateral side portion by a first end plate and the second lateral side being joined to the second lateral side portion by a second end plate.

14. The vehicle according to claim 11, wherein the inlet tapers from the first end toward the intermediate portion.

15. The vehicle according to claim 14, wherein the inlet diverges from the first end toward the intermediate portion.

16. The vehicle according to claim 14, wherein the inlet of the duct includes a first area and the outlet of the duct includes a second area, the second area being smaller than the first area.

17. The vehicle according to claim 11, wherein the intermediate portion includes a first curvature and the intermediate section includes a second curvature that is distinct from the first curvature.

18. The vehicle according to claim 11, wherein the inlet is axially off-set relative to the outlet.

19. The vehicle according to claim 11, wherein the passage continuously increases in width from the inlet to the outlet.

20. The vehicle according to claim 11, wherein the duct is mounted on an underbody of the vehicle.

* * * * *